United States Patent [19]

Veligdan

[11] Patent Number: 5,455,882
[45] Date of Patent: Oct. 3, 1995

[54] INTERACTIVE OPTICAL PANEL

[75] Inventor: James T. Veligdan, Manorville, N.Y.

[73] Assignee: Associated Universities, Inc., Washington, D.C.

[21] Appl. No.: 270,743

[22] Filed: Jul. 5, 1994

Related U.S. Application Data

[63] Continuation-in-part of Ser. No. 128,124, Sep. 29, 1993, Pat. No. 5,381,502.

[51] Int. Cl.$^6$ ................................................. G02B 6/06
[52] U.S. Cl. ..................... 385/116; 250/227.14; 348/804; 385/901
[58] Field of Search ..................... 385/115, 116, 385/120, 121, 901; 348/804, 805; 250/227.14, 227.28, 227.29

[56] References Cited

U.S. PATENT DOCUMENTS

| | | | |
|---|---|---|---|
| 3,680,078 | 7/1972 | Baskin et al. | 385/115 X |
| 4,090,104 | 5/1978 | Vann et al. | 313/422 |
| 4,620,230 | 10/1986 | Spiger | 348/769 |
| 4,824,194 | 4/1989 | Karasawa | 385/146 |
| 4,974,095 | 11/1990 | Arov | 348/758 |
| 5,018,007 | 5/1991 | Lang et al. | 348/795 |
| 5,042,892 | 8/1991 | Chiu et al. | 385/114 |
| 5,050,946 | 9/1991 | Hathaway et al. | 385/33 |
| 5,381,502 | 1/1995 | Veligdan | 385/115 |

FOREIGN PATENT DOCUMENTS 90-10882  9/1990  WIPO ................................. 385/120

OTHER PUBLICATIONS

Takashima et al, "Full Color Printer with a He–Cd+ White–light Laser," *Rev. Sci. Instrum. 62(5)*, May 1991, pp. 1238–1245.

Perry, *Consumer Electronics*, p. 31 (no date).

*Primary Examiner*—John D. Lee
*Attorney, Agent, or Firm*—Margaret C. Bogosian

[57] ABSTRACT

An interactive optical panel assembly 34 includes an optical panel 10 having a plurality of ribbon optical waveguides 12 stacked together with opposite ends thereof defining panel first and second faces 16, 18. A light source 20 provides an image beam 22 to the panel first face 16 for being channeled through the waveguides 12 and emitted from the panel second face 18 in the form of a viewable light image 24a. A remote device 38 produces a response beam 40 over a discrete selection area 36 of the panel second face 18 for being channeled through at least one of the waveguides 12 toward the panel first face 16. A light sensor 42,50 is disposed across a plurality of the waveguides 12 for detecting the response beam 40 therein for providing interactive capability.

18 Claims, 7 Drawing Sheets

INTERACTIVE OPTICAL PANEL

This invention was made with Government support under contract number DE-AC02-76CH00016, between the U.S. Department of Energy and Associated Universities, Inc. The Government has certain fights in the invention.

This is a continuation-in-part of U.S. patent application Ser. No. 08/128,124, filed Sep. 29, 1993 entitled "Flat or Curved Thin Optical Display Panel," presently U.S. Pat. No. 5,381,02.

The present invention relates generally to fiber optics, and, more specifically, to an optic panel usable in a laser/optical projection video display.

BACKGROUND OF THE INVENTION

Video display screens are commonly used in television (TV) for example, and typically use cathode ray tubes (CRTs) for projecting the TV image. In the United States, the screen has a width to height ratio of 4:3 with 525 vertical lines of resolution. An electron beam is conventionally scanned both horizontally and vertically in the screen to form a number of picture elements, i.e. pixels, which collectively form the image. Color images are conventionally formed by selectively combining red, blue, and green pixels.

Conventional cathode ray tubes have a practical limit in size and are relatively deep to accommodate the required electron gun. Larger screen TVs are available which typically include various forms of image projection against a suitable screen for increasing the screen image size. However, such screens have various shortcomings including limited viewing angle, limited resolution, and limited brightness and typically are also relatively deep and heavy.

Various configurations are being developed for larger screen TVs which are relatively thin in depth. These include the use of conventional fiber optic cables in various configurations for channeling the light image from a suitable source to a relatively large screen face. However, typical fiber optic thin projection screens are relatively complex and vary in levels of resolution and brightness. Accordingly, an improved thin or flat panel optical screen for use in a projection TV, for example, is lo desired.

Furthermore, TV screens are also being used interactively to present menu selections for programming VCRs, pay-for-view movies, and even conducting surveys for example. A remote device is typically used for making the selection by pressing one or more corresponding buttons. However, many users find it difficult to use conventional interactive remotes and selection menus.

SUMMARY OF THE INVENTION

An interactive optical panel assembly includes an optical panel having a plurality of ribbon optical waveguides stacked together with opposite ends thereof defining panel first and second faces. A light source provides an image beam to the panel first face for being channeled through the waveguides and emitted from the panel second face in the form of a viewable light image. A remote device produces a response beam over a discrete selection area of the panel second face for being channeled through at least one of the waveguides toward the panel first face. A light sensor is disposed across the waveguides for detecting the response beam therein for providing interactive capability.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
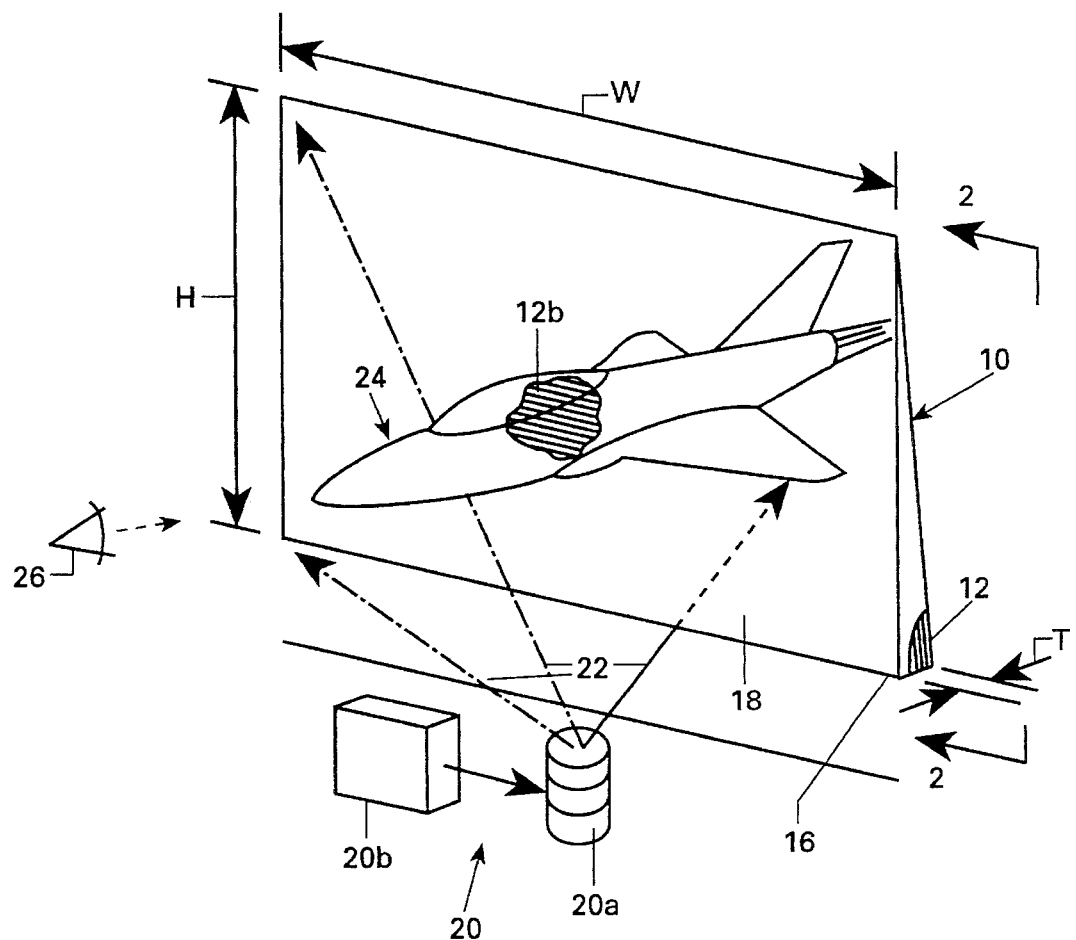
FIG. 1 is a schematic, perspective view of an exemplary optical panel in the form of a large screen projection TV. The respective components of the invention are not drawn to scale herein.

Illustrated schematically in FIG. 1 is an optical panel 10 for guiding or channeling light therethrough which is in the exemplary form of a video display screen such as a projection screen TV. A portion of the panel 10 is illustrated in more particularity in FIG. 2 and includes a plurality of elongate light guiding optical waveguides 12 each having a longitudinal centerline axis 14 along which light is guided. The waveguides 12 are stacked laterally together and parallel to each other in abutting contact along their entire lengths, with each waveguide 12 having a first edge or end 12a which in this exemplary embodiment is an input end for receiving or passing light therethrough. Each waveguide 12 further includes a second edge or end 12b at an opposite end thereof relative to the centerline axis 14 which, in this exemplary embodiment, is an output end for emitting or passing the light carried through the waveguide 12. The first ends 12a, therefore, preferably include means for coupling light to define input ends for receiving light and passing the light into the waveguide 12. For example, the input ends 12a may be simply conventionally optically polished to receive light in an optimum manner, as one type of suitable means for coupling light. The waveguide output, second ends 12b are effective for emitting or dispersing the light channeled through the waveguides 12 as further described hereinbelow.

Figure 2:
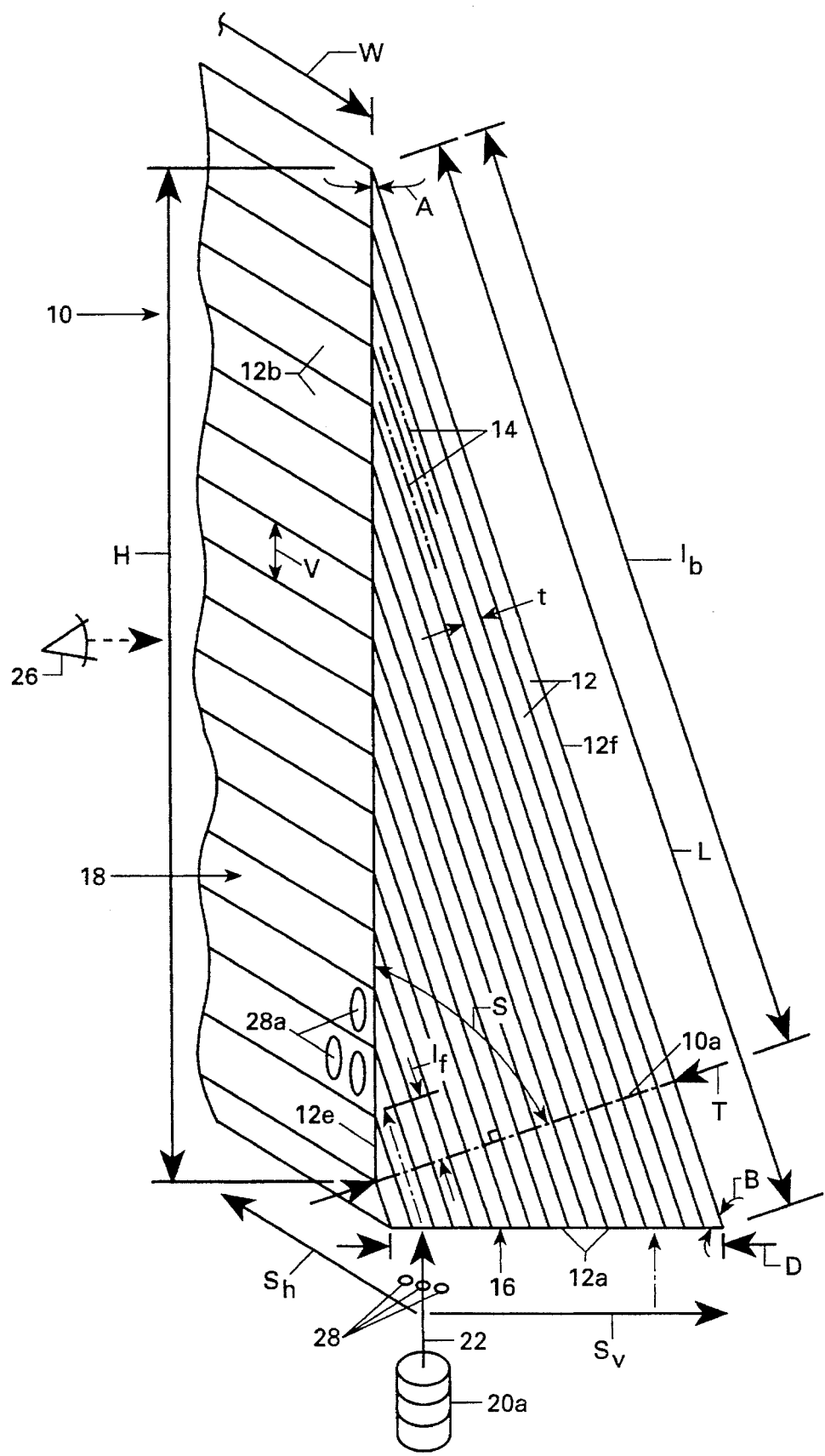
FIG. 2 is an enlarged, perspective, schematic elevational view of a portion of the optical panel illustrated in FIG. 1 and taken along line 2—2 therein and illustrates a plurality of exemplary planar optical waveguides therein.

In the exemplary embodiment illustrated in FIG. 2, the waveguides 12 are lo preferably in the form of generally flat sheets or ribbons each having a generally rectangular cross-section from the first end 12a to the second end 12b with a horizontal width W (see both FIGS. 1 and 2) being substantially greater than the thickness t of the waveguide 12. The waveguides 12 are stacked front-to-back in turn upon each other in abutting contact from the first to second ends 12a, 12b, with the second ends 12b extending continuously and horizontally along the width W without interruption from side-to-side.

As shown in FIG. 2, the first ends 12a of all the waveguides 12 are preferably disposed generally coplanar and collectively define a panel first or input face 16 for receiving light which first face 16 has a length or depth D. The second ends 12b of all the waveguides 12 are also preferably disposed generally coplanar and collectively define a panel second or output face 18, having a length or height H, which forms the viewing screen in this exemplary embodiment.

Figure 3:
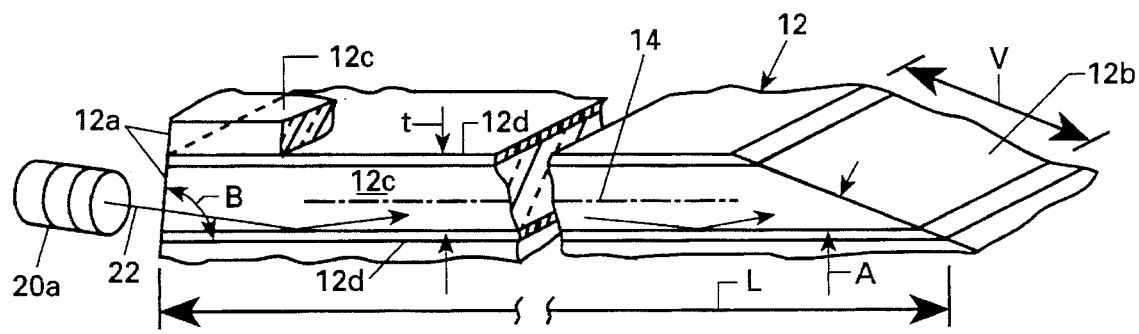
FIG. 3 is a partly sectional, enlarged view of an exemplary one of the waveguides illustrated in FIG. 2.

FIG. 3 illustrates in more particularity an exemplary one of the optical waveguides 12 shown in relation to portions of adjacent waveguides 12 in the panel 10. Each waveguide 12 includes an optically transparent core 12c having a suitable index of refraction or refractive index $n_2$, sandwiched between a pair of cladding sheets 12d having a lower refractive index $n_2$, i.e. $n_2$ being less than $n_1$. The light channeling property of the waveguide 12 is somewhat functionally equivalent to a conventional cylindrical fiber optic cable having a circular central core surrounded by an annular cladding with a lower refractive index so that light may be channeled therethrough and confined therein by total internal reflection. However, the ribbon waveguide 12 has significant additional advantages as described hereinbelow.

Referring again to FIG. 1, the panel 10 is disposed in combination with conventional means 20 for providing light in the form of a light beam 22 to the panel first face 16 for being observed from the panel second face 18 or viewing screen. The light providing means 20 may take any suitable and conventional form including for example a conventional scanning laser 20a illustrated schematically in FIG. 1 which is effective for emitting light in the form of a laser beam 22 into the first face 16. Suitable conventional electronics including a conventional intensity modulator 20b suitably control the generation of the beam 22 which is conventionally scanned over the first face 16 by a suitable scanning mirror to produce a video image 24 on the panel second face 18 using horizontal and vertical scanning. Since the panel 10 may have any suitable orientation in space, such as the vertical orientation shown in FIG. 1, the terms "vertical" and "horizontal" as used herein and in the claims broadly define two perpendicular directions in a relative sense for describing scanning both along the width W of the second face 18 (horizontal) and from waveguide-to-waveguide along the height H of the second face 18 (vertical). The panel 10 may alternatively be positioned horizontally in space for example, such as in a video game table, with vertical and horizontal scanning being relative to the observer looking downwardly at the screen panel 10.

The ribbon waveguide 12 allows the image beam 22 to be scanned across the width W of the ribbon and propagated at any suitable angle therein within the plane of the ribbon. As shown in FIG. 1, the second face 18 is preferably vertically disposed in an exemplary TV viewing screen application for being observed by an observer or viewer indicated schematically at 26. In a preferred embodiment, the scanning laser 20a includes three scanning lasers which respectively produce laser beams of red, blue, and green light, and which are conventionally varied in intensity and combined in a controlled manner for producing color images on the panel second face 18. Alternatively, a conventional white light laser that produces the three primary colors may be used to produce the varying color image.

As shown in FIG. 3, the light beam 22 enters an exemplary one of the waveguides 12 at its first end 12a with a suitable acceptance angle for being channeled internally within the waveguide 12 to thereby be transmitted to the second end 12b from which it is viewable. Referring again to FIG. 2, the individual waveguides 12 are configured and stacked together to provide a relatively thin (as shown by depth D) yet tall (as shown by height H) panel 10.

More specifically, the panel second face 18 is disposed at an acute face angle A relative to the waveguides 12 or their longitudinal axes 14 for defining an intermediate section 10a of the panel 10 of maximum thickness T between the first and second faces 16, 18 which section extends perpendicularly to the axes 14 from a front one 12e of the waveguides 12 to an opposite back one 12f of the waveguides 12. Again, the terms "front" and "back" as used herein and in the claims are relative terms for indicating the general stacking direction of the waveguides 12.

The panel 10 has its maximum thickness T at the intermediate section 10a as measured from the front waveguide 12e to the back waveguide 12f, and tapers in decreasing thickness along the vertical height of the panel second face 18 from the front to back waveguides 12e, 12f. The panel 10 also tapers in decreasing length of the respective waveguides 12 as their lengths are measured between the intermediate section 10a and the waveguide second ends 12b from that measured length of the back waveguide 12f, i.e. length $1_b$, to the front waveguide 12e, i.e. length $1f$.

The panel 10 is configured to be thin relative to the height H of the second face 18 by being made to have a relatively small acute face angle A, with the panel maximum thickness T being less than the length $1_b$ of the back waveguide 12f from the second end 12b thereof to the intermediate section 10a, and less than the height H of the panel second face 18 as measured along tile face 18 from the front waveguide 12e to the back waveguide 12f.

In the embodiment illustrated in FIG. 2, the intermediate section 10a is disposed perpendicularly to the longitudinal axes 14 and defines a spread angle S relative to the second face 18. The second face 18, the back waveguide 12f, and the intermediate section 10a define a right triangle in this exemplary embodiment, with the spread angle S being the complement of the acute face angle A, i.e., 90° - A. For a face angle A less than 45°, the maximum thickness T will be less than the length $1_b$ of the back waveguide 12f, as well as being less than the height H of the second face 18, which is the hypotenuse of the right triangle. By selecting a face angle A which is almost zero in magnitude, the complement spread angle S is almost 90°, and the intermediate section 10a is positioned almost perpendicular to the panel second face 18 to provide a significantly thin panel 10 with a relatively large second face height H.

Once the panel second face 18 is suitably configured as described above, the panel first face 16 may take any suitable configuration while still having a thin panel 10. For example, and referring again to FIG. 2, the first and second faces 16, 18 in accordance with the exemplary TV application of the present invention being described are disposed substantially perpendicularly to each other, with the waveguides 12 extending obliquely between the first and second faces 16, 18. In this way, the light beam 22 may be directed vertically upwardly into the horizontal first or bottom face 16, and be viewed by the observer 26 generally perpendicularly to the vertical second or front face 18.

As illustrated in FIG. 2, each of the waveguides 12 between its ends 12a, 12b has a substantially uniform thickness t measured perpendicularly to its centerline axis 14, with all of the waveguides 12 having preferably equal thicknesses t and abutting each other for collectively defining a substantially uniform maximum thickness T of the entire untapered portion of the panel 10. As described above, the panel thickness decreases from the intermediate section 10a to its top end due to the acute face angle A. Each waveguide 12 may be conventionally manufactured from a suitable optical material such as transparent glass or plastic with the required refractive index in its core 12c and a suitable cladding 12d having a different refractive index for channeling light through the core 12c. As shown in FIG. 3, adjacent cores 12c in sheet form are separated by a common sheet of cladding 12d, with the thickness t of each waveguide 12, therefore, including a respective one of the cladding sheets 12d. The waveguides 12 may be formed by interleaving sheets of the cladding 12d between sheets of the core 12c and suitably bonding together the sheets to form an integral assembly. For example, the core 12c and cladding 12d may be different plastics joined together by heat, acoustic energy, or other suitable means. Or, the core 12c may be glass, with the cladding 12d being a suitable adhesive.

Since the first and second faces 16 and 18 are oblique or perpendicular to each other, and the waveguides 12 extend obliquely between the first and second faces 16, 18 in this exemplary embodiment, the waveguides 12 necessarily vary in total longitudinal length L with the longest waveguide 12 being the back waveguide 12f on the backside of the panel 10, and the shortest waveguide 12 being the front waveguide 12e on the front side of the panel 10. And, since the second face 18 is disposed at the acute face angle A relative to the waveguides 12 or the longitudinal axes 14 thereof, each of the waveguide second ends 12b in the second face 18 is preferably beveled at the same acute face angle A to form a planar add continuous second face 18. In the exemplary embodiment illustrated in FIG. 2, the panel second face 18 extends vertically, with each of the waveguide second ends 12b having a vertical height V, with the vertical height H of the second face 18 being simply the sum of the individual vertical heights V. The height, or depth D of the first face 16 measured from the front to the back of the panel 10 is substantially or almost equal to the panel maximum thickness T in the illustrated embodiment. The first face depth D and the panel maximum thickness T are substantially smaller than the second face height H to provide the relatively thin yet tall panel 10 as described above.

More specifically, in a preferred and exemplary embodiment configured for standard US television having 525 lines of resolution, 525 of the waveguides 12 would be provided to provide 525 vertical waveguide second ends 12b forming the panel second face 18 or viewing screen. The height H of the second face 18 may be arbitrarily selected at about 1 meter, with the widths W of the waveguides 12 also being arbitrarily selected at 1.33 meters to effect a standard U.S. TV width-to-height ratio of 4:3. Of course other width-to-height ratios may be suitably selected and the vertical resolution may be increased or decreased as desired by simply changing the number and size of stacked waveguides 12.

In order to have a suitably thin panel 10, the face angle A may be selected as small as practical for effectively channeling the light beam 22 from the waveguide first ends 12a to the second ends 12b. For example, in order to have a panel maximum thickness T of about 2.54 cm, and a panel second face height H of 1 meter (100 cm), the required face angle A is merely the inverse sine of 2.54/100 which is 1.46°. The spread angle S is therefore 90° minus 1.46° or 88.54° which is almost 90°. The thickness t of each of the waveguides 12 is correspondingly 2.54 cm/525 which is about 48 microns of which the required cladding thickness is relatively small and on the order of about 1 or 2 microns. In view of this substantially small bevel or face angle A and large spread angle S, an optical panel 10 having a tall viewing screen 18 may be made which is also significantly thin in its depth from front to back. Since the first face 16 is preferably perpendicular to the second face 18 in this exemplary embodiment, the thickness of the panel 10 as measured by the depth D of lo the first face 16 is simply the panel maximum thickness T divided by the cosine of the face angle A which is substantially equal to the panel thickness T itself. Note that the included angle B between the axes 14 of the waveguides 12 and the panel first face 16 is slightly less than 90° in this exemplary embodiment, or 90°−1.46°= 88.54°, and is equal to the spread angle S in the exemplary embodiment illustrated.

In the preferred embodiment illustrated in FIG. 2, the waveguide second ends 12b are preferably vertically continuous with each other from the front to back waveguides 12e, 12f to form a vertically continuous second face 18 therebetween, there being 523 waveguides stacked therebetween for a total of 525 waveguides 12. Since the waveguides 12 are preferably in ribbon or sheet form and stacked together like book pages, the resulting second face 18 includes substantially no dead space, the only dead space being due solely to the relatively small amount of cladding exposed thereat, thus a substantially 100% light emitting or viewing surface is provided. Such a surface provides an enhanced and higher brightness level of light as compared to conventional fiber optic cables having circular configurations which would have substantial dead space between abutting adjacent fibers. Furthermore, the second face 18 is horizontally continuous without interruption along its width W since flat ribbon waveguides 12 are preferred and may be made as wide or as narrow as desired. The second face 18 is therefore continuous and flat both vertically and horizontally. However, in alternate embodiments it may be non-planar and interrupted if desired.

As shown in FIG. 2, the scanning laser 20a is conventionally effective for scanning the laser beam 22 both horizontally along the widths W of the waveguide first ends 12a to effect a horizontal scan $S_h$ in the first face 16 which is carried to the second face 18, and from waveguide-to-waveguide in the first face 16, from front to back, to effect a vertical scan $S_v$ carried to the second face 18, with each scan location defining a discrete picture element or pixel 28. The cross-sectional area of the laser beam 22 may be conventionally selected relative to the thickness t of the waveguides 12 to transmit a circular pixel, for example, into the first end 12a. The pixel 28 will be elongated at the waveguide second end 12b by the reciprocal of the inverse sine of the face angle A which is about forty-times, for example in the preferred embodiment described above. The vertical resolution of the second face 18 is merely the number of corresponding pixels 28a produced therein which is equal to the number of waveguides 12, for example 525. The horizontal resolution, however, is selectively variable as desired by simply controlling the number and size of the horizontal pixels 28 produced by the scanning laser 20a. Accordingly, the number of pixels 28 both vertically and horizontally may be selected as desired for controlling the resolution as well as the size of the image 24 produced on the panel second face 18. And since substantially 100% of the surface area of the panel second face 18 is the light carrying core material 12c, substantial brightness is obtained therefrom without significant dead space.

As shown in FIG. 2, the panel 10 is configured for positioning the second face 18 vertically for the observer 26 to view the image 24 thereon by merely horizontally facing the second face 18. In this way, the observer 26 cannot look directly into the laser beams 22 channeled longitudinally through the waveguides 12. As shown in FIG. 3, the waveguide second ends 12b are preferably conventionally optically frosted for diffusing light therefrom for forming the pixels 28a thereon. As shown in FIG. 1, the scanning laser 20a of the light providing means 20 is effective for transmitting a television or video image 24 vertically upwardly into the horizontal first face 16 for viewing from the vertical second face 18 which is disposed perpendicularly to the first face 16. A substantially large laser scanning projection TV is thereby created. And, most significantly, the depth or maximum thickness T of the optical panel 10 is significantly small for providing a relatively thin or flat panel screen for viewing.

Figure 4:
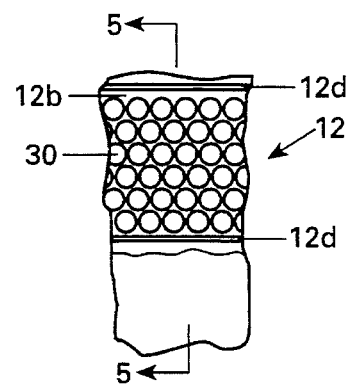
FIG. 4 is an end view of a portion of a second end of one of the waveguides illustrated in FIG. 2 in an alternate embodiment including a plurality of concave indentations therein.
Figure 5:
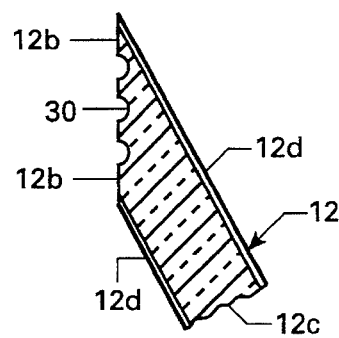
FIG. 5 is an elevational sectional view through the end of the waveguide illustrated in FIG. 4 and taken along line 5—5.

The waveguide second ends 12b may take other forms for suitably diffusing light to produce the resulting image 24 such as shown for example in FIGS. 4 and 5. In this alternate embodiment, each of the waveguide second ends 12b includes a plurality of vertically and horizontally spaced apart concave indentations or negative lenses 30 for diffusing the light emitted therefrom for viewing by the observer 26 (see FIG. 1) perpendicularly to the waveguide second end 12b.

Figure 6:
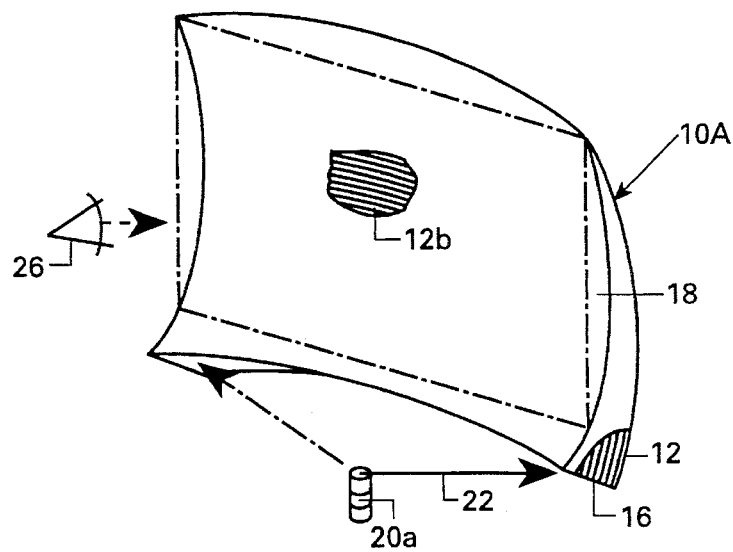
FIG. 6 is a schematic view of an optical panel in accordance with another embodiment wherein the waveguides are arcuate.

In the embodiment of the invention illustrated in FIGS. 1–5, each of the waveguides 12 is preferably planar or flat from its first end 12a to its second end 12b without bending or twisting thereof. Furthermore, the second face 18 as shown in FIGS. 1 and 2 is also preferably planar or flat for providing a generally flat viewing screen. Similarly, the first face 16 is also preferably planar or flat. In alternate embodiments, the first and second faces 16 and 18 need not be planar but may be varied in shape as desired. For example, FIG. 6 illustrates the optical panel in accordance with an alternate embodiment designated 10A which is not a planar or flat screen but is nevertheless thin in its depth relative to the height and width of the screens. In this embodiment, each of the waveguides 12 is arcuate, for example vertically arcuate along the longitudinal axes 14 (see FIG. 1), and the second face 18 is correspondingly vertically concave. The waveguides 12 may also be horizontally arcuate along the waveguide width W (see FIG. 1) and the second face 18 may be also correspondingly horizontally concave. By combining both vertically and horizontally arcuate waveguides 12 to form a both horizontally and vertically concave second face 18, the second face 18 may be a portion of a spherical surface to provide a wraparound viewing effect of the screen for the observer 26 positioned at a suitable viewing point thereof.

Furthermore, the first face 16 may be horizontally concave along the waveguide width W and face downwardly toward the laser 20a so that the scanning laser 20a may transmit the laser beam 22 thereto with less of an incidence angle relative thereto.

The optical panel 10 described above effectively provides a relatively large viewing area with a significantly thin screen and provides high resolution and brightness. As described above, the vertical resolution may be changed by varying the number of stacked waveguides 12 which, for a high definition TV (HDTV) system would use 1,100 waveguides 12 for obtaining 1,100 lines of resolution. The horizontal resolution is simply controlled by varying the number of pixels 28 by changing the laser spot size produced along the width of each waveguide 12. The laser light beam 22 enters the stacked waveguides 12 at the bottom, first face 16 after being reflected from a scanning mirror of the laser 20a which rasters the beam 22 horizontally across each waveguide 12 for the horizontal scan $S_h$ as well as for the vertical scan $S_v$. The light beam 22 travels upwardly through each of the waveguides 12 and exits the respective second ends 12b which form the viewing screen, or second face 18.

The light providing means 20 may take any conventional form and may use conventional mechanical scanning mirrors for scanning the light into the panel first face 16, or may use other suitable acousto-optic or electro-optic devices as desired. The image means 20 may also take the form of conventional diode lasers producing red, green, and blue light suitably combined for providing color images.

Since the panel 10 functions to channel or guide light or similar energy, its two faces 16, 18 may have any suitable coatings or devices cooperating therewith to enhance transmission or dispersion characteristics of the channeled beam as desired. The beam may enter the first face 16 and exit the second face 18 as described above, or vice versa as described below, depending upon the desired application of the panel 10.

Figure 7:
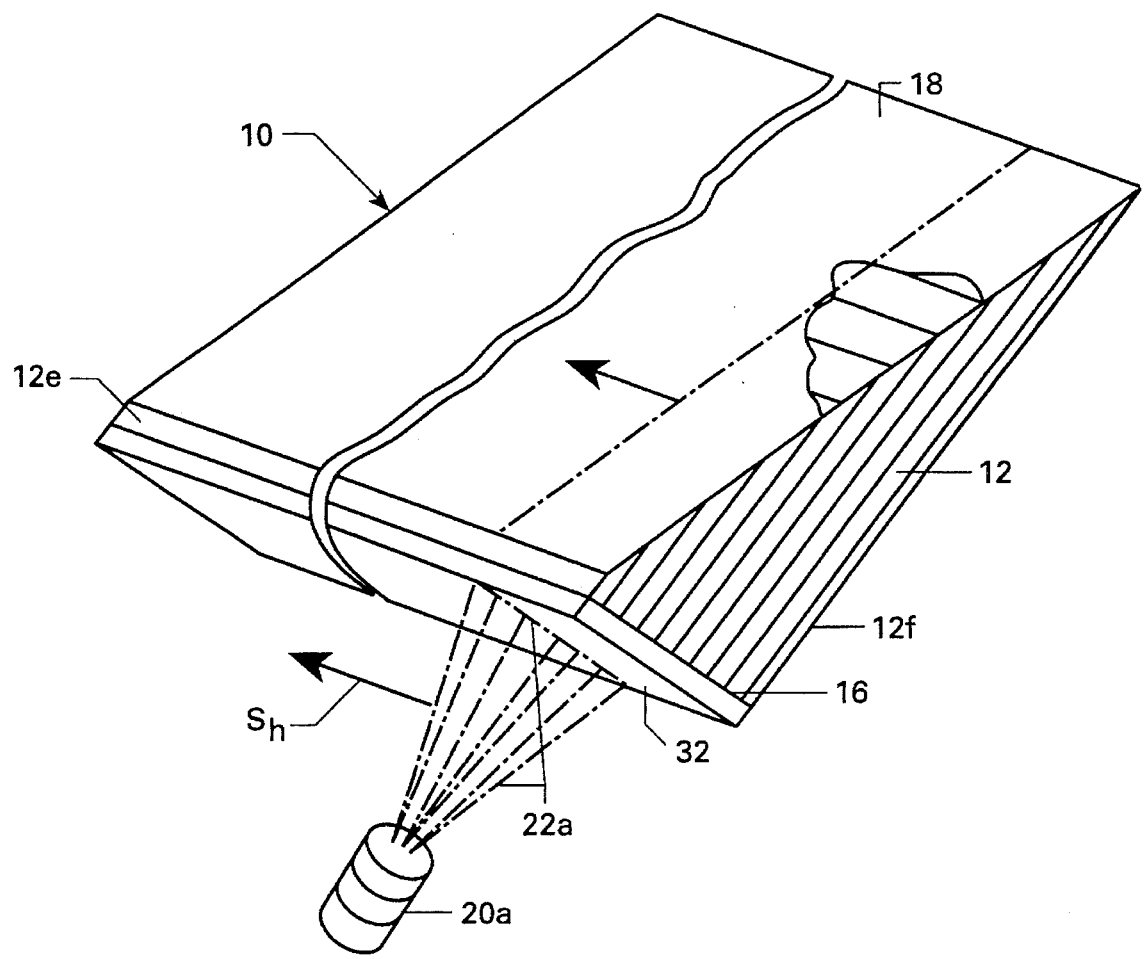
FIG. 7 is a schematic view of an optical panel in a large screen projection TV in accordance with another embodiment having a light modulator at an input face thereof.

For example, FIG. 7 illustrates schematically the panel 10 in accordance with an alternate embodiment of the invention also in the form of a projection TV like that shown in FIG. 1. However, in this embodiment, conventional means in the form of a light modulator 32 adjoins the panel first face 16 for modulating the intensity of the input light from the laser 20a.

The laser 20a conventionally produces a line or strip of light 22a into the modulator 32 simultaneously across or over all 525 waveguides 12 from the front waveguide 12e to the back waveguide 12f. Whereas the circular laser beam 22 in the FIG. 1 embodiment must raster each of the 525 waveguides 12 individually, the strip laser beam 22a in FIG. 7 simultaneously scans all 525 waveguides 12 together. This will provide a higher refresh rate on the screen, or panel second face 18, and reduce or eliminate flicker.

The light modulator 32 modulates each laser beam strip 22a from waveguide-to-waveguide 12 to vary the intensity of the light at each of the 525 waveguides to provide a simultaneous scan line to form a vertical line of the image on the second face 18. The laser beam strip 22a is then scanned horizontally along the width of the waveguides, i.e. $S_h$, to produce the resulting two-dimensional images on the second face 18.

The light modulator 32 may take any suitable form which is effective to modulate light at each of the plurality of waveguides 12 in the two perpendicular directions along the width of the waveguides 12 and from the front to back waveguides 12e, 12f to produce a two-dimensional checkerboard-type grid. The vertical resolution of the second face 18 is again limited by the number of waveguides 12 stacked together, with the horizontal resolution being selectively variable by both thickness of the laser beam strip 22a and resolution capability of the light modulator 32.

For example, the light modulator 32 may be in the form of a conventional thin lo film semiconductor suitably bonded to or adjoining the panel first face 16 for modulating the input light into the waveguides 12. Conventional Active Matrix Liquid Crystal Displays (AMLCD), or Spatial Light Modulators (SLM) being developed, or other suitable devices may be used to provide the required light modulation.

Of course, since the thin optical panel 10 is a uniquely efficient device for channeling light, it may have other uses besides large screen projection TV. It may be used wherever a relatively thin, lightweight, high resolution and brightness light channeling device is required wherein the thin panel provides advantage.

Although the waveguides 12 are preferably in ribbon form, conventional cylindrical optical fibers could also be configured with at least one end being sharply bevelled to define an acute angle with the longitudinal axes of the fibers. However, this would then predetermine the horizontal resolution as well as the vertical resolution, and provide dead space between the fibers which would decrease screen brightness.

As indicated above, the optical panel 10 in the exemplary embodiment illustrated in FIGS. 1–3 is effective for channeling light in two directions either from the panel first face 16 to the panel second face 18 for viewing the image 24, or vice versa, or both. Since the ribbon waveguides 12 are continuous from the left to right ends of the panel 10, the panel 10 may be used in an interactive optical panel assembly 34 shown schematically in FIG. 8 which utilizes the reverse light channeling capability of the panel 10 for obtaining interactive responses from the viewer 26.

Figure 8:
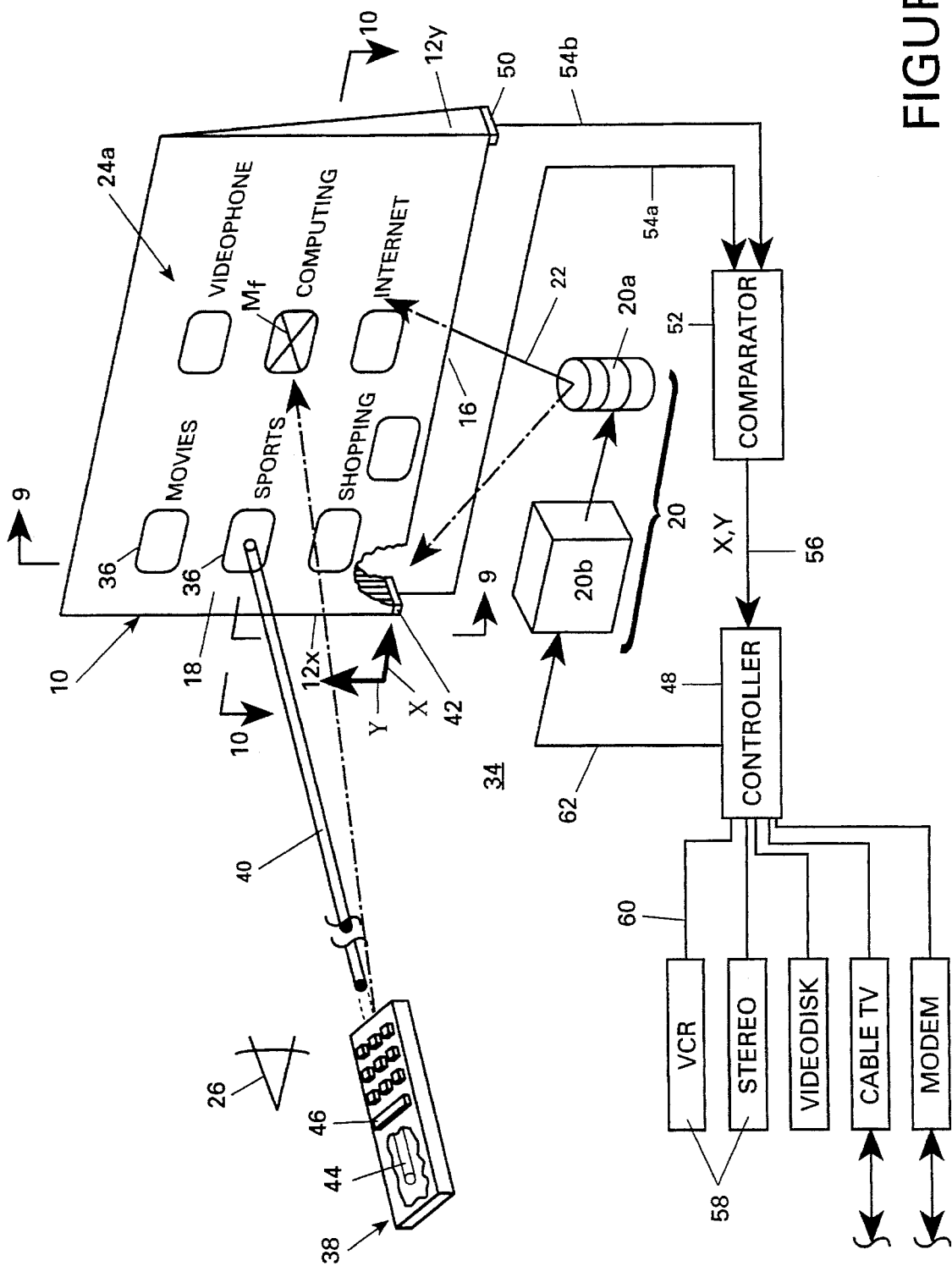
FIG. 8 is a schematic representation of the optical panel shown in FIGS. 1–3 used in an interactive assembly in accordance with an exemplary embodiment of the present invention.
Figure 9:
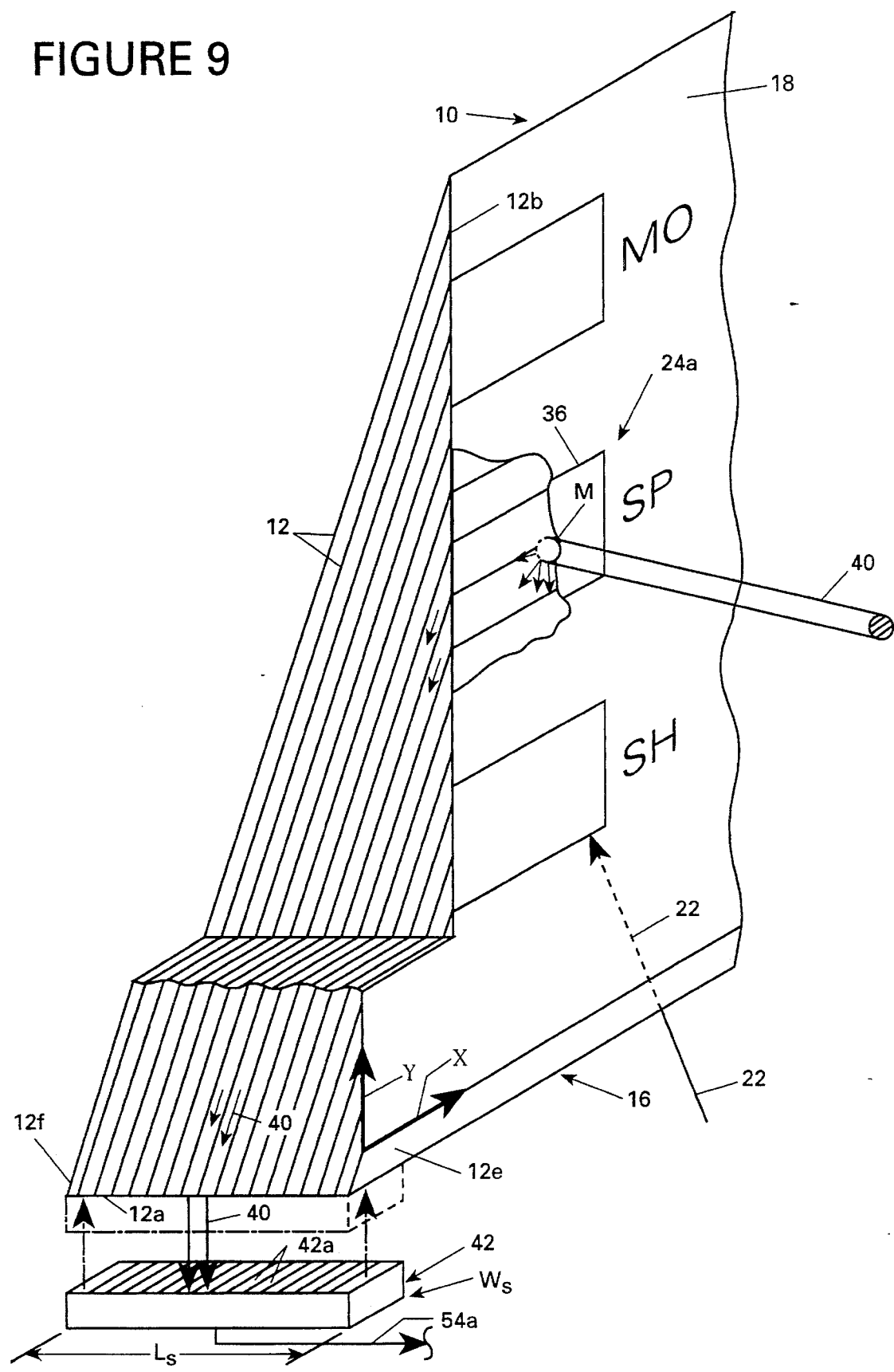
FIG. 9 is an elevational, partly sectional and exploded view of a portion of the optical panel illustrated in FIG. 8 and taken generally along line 9—9.

More specifically, the interactive assembly 34 includes the optical panel 10 as shown in FIG. 9, for example, with a predetermined number N of the ribbon waveguides 12 stacked together as described above, with the first ends 12a thereof defining the panel first face 16, and the second, opposite ends 12b defining the panel second face 18. The number N is selected as described above for providing a suitable vertical resolution in the optical panel 10 either having 525 waveguides 12 for standard US television, or about 1,100 waveguides 12 for the HDTV application, or a suitable other number as desired. The light source or image means 20 as described above provides the desired image laser beam 22 to the first face 16 for being channeled through the waveguides 12 and emitted from the panel second face 18 in the form of the viewable light image designated 24a in the embodiment illustrated in FIGS. 8 and 9 which is an exemplary selection menu displaying various choices which may be selected by the viewer 26. The selection menu 24a as illustrated in FIG. 8 may take any suitable form such as the written selections illustrated, with each selection having a corresponding discrete selection area in the exemplary form of rectangular boxes 36 for viewing by the viewer 26. The selection areas 36 may include the area of the written selections themselves, or suitable icons, or any suitable representation indicative of a selection.

A remote control device 38 as illustrated in FIG. 8 is selectively pointable by the viewer 26 toward the screen or panel second face 18 and is effective for selectively producing a response beam 40 in the form of collimated light over the discrete selection area 36 or a suitable portion thereof for being back-channeled through at least one of the waveguides 12 toward the panel first face 16 as illustrated in more particularity in FIG. 9. A conventional first light sensor or detector 42 in the exemplary form of a linear diode array is suitably disposed at one end, e.g. the left end, of the panel 10 across a plurality of the waveguides 12 for detecting the response beam 40 therein.

In the exemplary embodiment illustrated in FIG. 9, the light sensor array 42 extends across all of the waveguides 12 from front to back and includes at least one light sensing diode 42a for each of the predetermined number N of the waveguides 12 for detecting the response beam 40 in each of the plurality of waveguides 12 to determine vertical location of the selection area 36 which receives the response beam 40. Since each waveguide 12 is in ribbon form, the response beam 40 received at the waveguide second ends 12b defining the screen 18 will scatter throughout the waveguide 12 toward the first end 12a thereof as well as toward the left and right sides or edges thereof, designated 12x and 12y, respectively, as shown in FIG. 8. The light sensor 42 may therefore be located at any suitable position across the waveguide first ends 12a or side edges 12x, 12y for detecting the back-channeled response beam 40, and in the preferred embodiment illustrated is disposed across the first ends 12a defining the first face 16.

A suitable light sensor 42 for the panel 10 is a linear image sensor which is a monolithic, self-scanning photo-diode array having 1,024 diodes 42a therein as available from Hamamatsu Corporation of Japan. The sensor 42 has a width $W_2$ of about 2 mm and a length $L_s$ of about 20 mm and can be used with a correspondingly sized optical panel 10 with one or more of the diodes 42a adjoining each of the waveguides 12 for detecting the response beam 40 therein. This exemplary sensor is also effective for detecting visible through infrared light as described in more detail hereinbelow. In alternate embodiments, conventional charge-coupled devices (CCD) could also be used.

In the exemplary embodiment illustrated in FIG. 8, the remote device 38 may be similar in configuration to typical infrared (IR) television remote control with a plurality of suitable buttons thereon. For purposes of the present invention, the remote device 38 preferably includes a conventional laser 44 for producing a response beam 40 in the form of concentrated laser light upon pushing of a corresponding button 46 of the device 38. As indicated above, the laser 20a of the image means 20 illustrated in FIG. 8 is effective for producing the image beam 22 in the form of visible laser light in color. Since the image beam 22 is channeled through the waveguides 12 to form the selection menu image 24a, some of that light is necessarily reflected within the waveguides 12 which extend vertically and horizontally, and is channeled to the light sensor 42. The response beam 40 when generated by the remote device 38 enters the optical panel 10 through the screen or second face 18 and is also carried or scattered both horizontally and vertically through the waveguides 12 as illustrated in FIG. 9.

Accordingly, the light sensor 42 is preferably configured for sensing from the waveguides 12 solely the response beam 40 while excluding the image beam 22 to lo prevent interference or crosstalk by the image beam 22 with the response beam 40. For example, the image means 20 and the laser 44 of the remote device 38 may be configured for producing respective image and response beams 22, 40 having different light wavelengths. The light sensor 42 is correspondingly configured for optically discriminating the response beam 40 from the image beam 22. Since the image beam 22 necessarily produces an image 24a visible to the viewer 26, it has corresponding visible light wavelengths. In contrast, the laser 44 of the remote device 38 is preferably configured for producing at least non-visible light to effect or create the response beam 40, and the light sensor 42 is effective for detecting this non-visible light of the response beam 40 to avoid interference by the image beam 22. The non-visible light produced by the remote device 38 may simply be infrared light, and the exemplary light sensor 42 described above is capable of detecting both visible and infrared light. By using a suitable thin film optical filter over the diodes 42a, visible light will be prevented from entering the diodes 42a while permitting detection of solely the IR light.

However, in order to allow easy use of the remote device 38 in a simple point-and-click of the button 46 manner, it is desirable that the remote device 38 be effective for producing also a visible mark designated M in FIGS. 8 and 9 at the selection area 36 in addition to producing the non-visible light in the response beam 40 being detected by the light sensor 42. In one embodiment, the laser 44 of the remote device 38 is effective for producing both visible and non-visible (IR) laser light, with the light sensor 42 being effective for detecting solely the non-visible laser light from the remote device 38 as described above. In this way, the visible light from the remote device 38 may be selectively aimed at the panel 10 for producing the visible mark M like a spotlight. Alternatively, once the light sensor 42 detects the non-visible response beam 40, a suitable controller 48 (see FIG. 8) of the assembly 34 may cause the image laser 20a to produce a corresponding visible mark such as the X labeled $M_f$ illustrated in FIG. 8. In either case, pointing of the remote device 38 should provide a visible feedback mark M or $M_f$ to the viewer for indicating the pointed-to position on the screen 18.

Besides optically discriminating the response beam 40 from the image beam 22, the respective beams may be discriminated using their modulation frequencies. The image means 20 and the remote device 38 may be configured for producing respective image and response beams 22, 40 at different modulation frequencies, with the light sensor 42 being effective for frequency-discriminating the response beam 40 from the image beam 22. The typical refresh rate of a TV screen is about 30 Hz or 60 Hz, and the image thereon may move at various motion frequencies on the order of 1,000 Hz or more. The image beam 22 is typically modulated at several thousand Hertz for accurately creating the required pixels 28. Accordingly, the response beam 40 generated by the laser 44 should be preferably modulated at a frequency suitably greater than the modulation frequency of the image beam 22 in order to prevent interference or crosstalk therebetween. For example, the response beam 40 may be modulated at about 50 KHz for avoiding interference with the image beam 22 and the moving image on the screen 18.

As shown in FIG. 9, the response beam 40 effects a visible mark M in the selection area or box 36 for the "sports" category (see also FIG. 8). The response beam 40 enters one or more of the waveguides 12 at their second ends 12b forming the screen 18. Since the screen 18 in the preferred embodiment is frosted for optically dispersing the image beam 22, it also optically disperses the response beam 40 which propagates in an opposite direction relative thereto. The response beam 40 is channeled downwardly through the waveguides 12 as illustrated in FIG. 9 to the first ends 12a thereof at which locations the response beam 40 is detected by the diodes 42a of the light sensor 42. The vertical location of the selection area 36 which receives the response beam 40 is thereby determined by which of the corresponding diodes 42a in the linear array of the light sensor 42 are excited. Excitation of the diodes 42a closest to the front end of the light sensor 42 adjacent to the screen 18 (front waveguide 12e) corresponds with a vertical location of the visible mark M at the bottom of the screen 18. Excitation of the diodes 42a at the opposite end of the light sensor 42 adjacent to the back-most one of the waveguides 12f is indicative of vertical location at the top of the screen 18. The light sensor 42 may be therefore calibrated for accurately determining vertical position of the visible mark M on the screen 18 based on the corresponding position of the excited diodes 42a along the length of the light sensor 42. The vertical position of the mark M on the screen 18 as designated by its corresponding Y coordinate may then be conventionally compared within the controller 48 with the respective vertical locations of the several selection areas or boxes 36 to determine which selection area is desired.

Although the light sensor 42 is disposed across the waveguide first ends 12a in the preferred embodiment, it may alternatively be disposed across either the left or right side edges 12x, 12y of the waveguides 12 for similarly detecting the vertical position of the response beam 40 by identifying the corresponding waveguide or waveguides in the stack through which the beam 40 is channeled.

In its simplest embodiment, the selection area 36 may be limited to solely different horizontal strips of the screen 18 vertically differentiated from each other such as the leftmost column of selection areas 36 illustrated in FIG. 8. In this way, the visible mark M may be placed at a corresponding vertical one of the selection areas 36, with the light sensor 42 indicating which vertical position has been selected.

Figure 10:
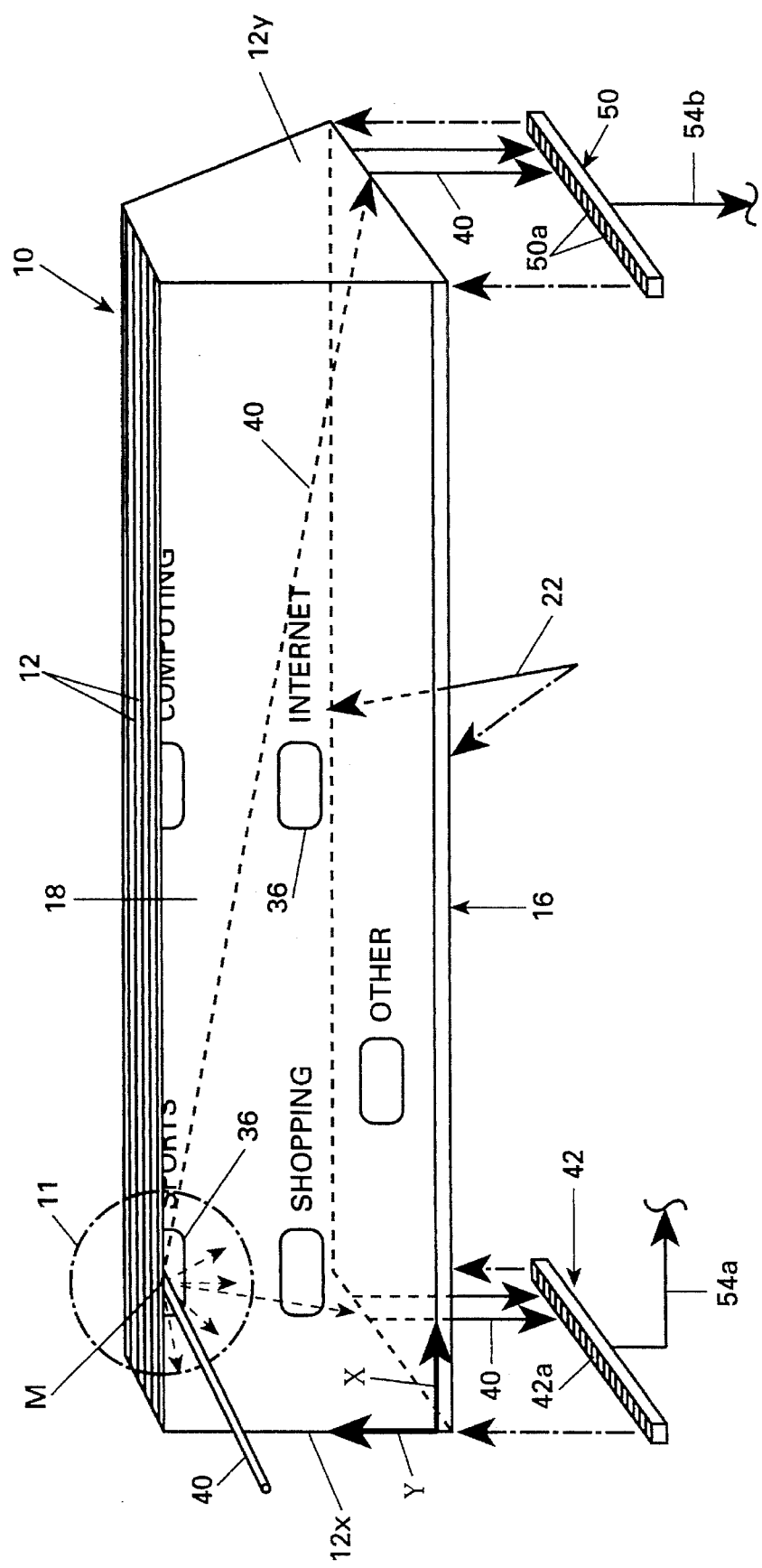
FIG. 10 is an elevational, partly exploded and sectional view of the optical panel illustrated in FIG. 8 sectioned along line 10—10 therein.

However, in order to provide both vertical and horizontal discrimination over the screen 18, the assembly 34 as illustrated in FIG. 8 preferably includes two identical light sensors, i.e. the first or left light sensor 42 preferably disposed at the left end of the panel first face 16, and a second or right light sensor 50 preferably disposed at an opposite, or right end of the panel first face 16 across the plurality of waveguides 12 for also detecting the response beam 40 therein. FIG. 10 shows in exploded view the left light sensor 42 disposed at the left end of the panel first face 16, and the right light sensor 50 disposed at the right end of the panel first face 16 with both sensors 42, 50 extending front-to-back across preferably all of the waveguides 12 from waveguide-to-waveguide. As indicated above, since the screen 18 is preferably frosted, the response beam 40 is dispersed or scattered upon entering the waveguide core 12c and therefore scatters both horizontally and vertically within each of the waveguides 12 upon which the mark M is formed.

Although the first and second sensors 42, 50 are preferably disposed across the panel first face 16, they could alternatively be disposed across the left and right side edges 12x, 12y for similarly detecting the response beam 40 scattered thereto.

As shown in FIG. 10, the response beam 40 will travel both vertically downwardly as well as horizontally both left and right to both opposite side ends of the optical panel 10 and be detected by the two light sensors 42, 50. Accordingly, the horizontal, or X location along the waveguides 12 between the panel opposite ends of the selection area 36 highlighted by the visible mark M may be determined by detecting difference in the response beam 40 sensed by the corresponding diodes 42a, 50a of the left and right light sensors 42, 50.

More specifically, as shown in FIG. 8, the assembly 34 further includes a conventional electronic comparator 52 operatively joined to both the first and second light sensors 42, 50 by respective electrical lines 54a, 54b. The comparator 52 is operatively connected to the controller 48 by another electrical line 56. In operation, electrical signals from the respective diodes 42a, 50a, of the left and right diode arrays 42, 50 are carried to the comparator 52 and in turn to the controller 48. As indicated above, the vertical (Y) location of the selection area 36 highlighted by the response beam 40 may be determined by identifying the corresponding diode or adjacent diodes 42a or 50a in either or both of the light sensors 42, 50. Since the response beam 40 may travel horizontally through each of the waveguides 12, it can be detected by either the left light sensor 42 or the right sensor 50, with either sensor providing an indication of the vertical position thereof. Since the horizontal position of the response beam 40 varies between the left and right light sensors 42, 50 the light received by those sensors 42, 50 will necessarily differ. This difference in detection of the response beam 40 by the left and right sensors 42, 50 is indicative of the horizontal (X) position of the response beam 40.

For example, the comparator 52 may be configured for determining intensity of the response beam 40 sensed by the first and second light sensors 42, 50, with the horizontal location of the selection area 36 highlighted by the response beam 40 being proportional to the relative intensity therebetween. In a simple example, if the response beam 40 is positioned equidistantly horizontally between the left and right sensors 42, 50 the intensity of the response beam 40 detected thereby will be substantially equal which indicates horizontal location of the response beam 40 equidistantly therebetween. If the response beam 40 is aimed at the extreme left end of the screen 18, the left sensor 42 should detect maximum intensity, and the right sensor 50 should detect minimum intensity indicating horizontal location of the response beam 40 at the left end of the screen 18. And, similarly, if the response beam 40 is aimed at the right end of the screen 18, the right sensor 50 will detect maximum intensity whereas the left sensor 42 will detect minimum intensity indicating location of the response beam 40 at the right end of the screen 18. Accordingly, the comparator 52 may be suitably calibrated and contain conventional schedules indicative of the horizontal (X) location of the response beam 40 in response to the relative intensity of the response beam 40 received by the two light sensors 42, 50. The comparator 52 may also conveniently contain additional schedules for determining the vertical (Y) location of the response beam 40 based on the relative intensity of the response beam 40 along the length of each of the light sensors 42, 50.

The horizontal location of the response beam 40 may also be determined using a reference clock contained in the controller 48 or the comparator 52 for timing arrival time of the respective light sensed by the left and right light sensors 42, 50, with the horizontal location of the selection area 36 highlighted by the response beam 40 being proportional to relative arrival time therebetween. Since the light sensors 42, 50 are solid state devices, they may be configured for having relatively fast rise or response times so that arrival of the scattered response beam 40 to the respective light sensors 42, 50 may be timed for indicating horizontal position. If the arrival time of the response beam 40 is the same for both the left and right sensors 42, 50, the response beam 40 is therefore equidistantly located between the two sensors 42, 50. If the response beam 40 reaches the left sensor 42 before the right sensor 50 is therefore closer to the left sensor 42. And, similarly, if the response beam 40 reaches the right sensor 50 before the left sensor 42, it is closer to the right sensor 50 which may all be calibrated for accurately determining horizontal (X) position of the response beam 40.

Accordingly, when the selection menu image 24a is projected on the screen 18, the vertical and horizontal (X, Y) locations of the several selection areas 36 are known and temporarily stored in the controller 48, for example. In the embodiment illustrated in FIG. 8, the remote device 38 is actuated by pointing the device 38 at the "sports" selection area 36 and pressing or clicking the response button 46 to produce the response beam 40. The visible mark M is produced within the corresponding selection area 36 and travels backwardly through the waveguides 12 to the first and second sensors 42, 50 from which the horizontal and vertical (X, Y) location of the response beam 40 is determined in the comparator 52. The controller 48 then compares the horizontal and vertical location of the response beam 40 on the screen 18 with the stored locations of the several selection areas to determine the corresponding selection area 36 identified. In this simple point-and-click arrangement, the viewer 26 may easily select from the various choices presented on the screen 18. Of course, the selection menu 24a may be configured as desired for interactively controlling any suitable device.

More specifically, FIG. 8 illustrates a plurality of exemplary controlled devices 58 which include for example a video cassette recorder (VCR), a high fidelity stereo, a videodisc player, a cable TV box joined to a transmission station through a conventional cable wire, and/or a conventional modem joined to a telephone wire or computer. One or more of these controlled devices 58 may be operatively joined to the controller 48 by respective electrical lines 60. The controller 48 is also operatively joined to the light providing means 20 by a suitable electrical line 62. The controller 48 can present any suitable selection menu 24a on the screen 18 for controlling any one or more of the devices 58. The viewer 26 may simply respond to the selection choices presented on the screen 18 by pointing the remote device 38 and lo actuating the response beam 40 on the desired selection area 36. The vertical and horizontal location of the response beam 40 is matched in the controller 48 with one of the selection areas 36 for indicating that choice, and the controller 48 may then provide suitable control of the controlled device 58 in response to the selection.

For the VCR, it may be simply programmed by responding to suitable selection menus 24 presented on the screen 18. For the stereo, it too may be controlled by responding to corresponding selection menus 24a on the screen 18. For the videodisc player, it may be similarly controlled, with additional interactive capability being provided for also selecting multiple story conclusions selectively available from the videodisc. The cable TV box may be also controlled for controlling channels, or ordering pay-per-view movies, or sports, or shopping, etc. The modem may be controlled for communicating with remote fax machines or computers for example.

The ribbon waveguides 12 forming the optical panel 10 described above thereby make possible the use of the panel 10 for both projecting images thereon as well as receiving an interactive response from the remote device 38 in a relatively simple arrangement. The horizontally continuous waveguides 12 allow the light sensors 42, 50 to be placed at extreme left and fight ends of the panel 10 so that they do not obstruct the path of the image beam 22 which would locally interrupt the image on the screen. Since the screen 18 is preferably frosted in the preferred embodiment, the incidence angle of the response beam 40 is not critical and may vary widely to either the left or right side of the screen 18 with effective results. Even a third order reduction in intensity of the response beam 40 received by the light sensors 42, 50 may be readily detected for accurately determining the vertical and horizontal location of the response beam 40 on the screen 18.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

I claim:

1. An interactive optical panel assembly 34 comprising:

an optical panel 10 including a predetermined number of ribbon optical waveguides 12 stacked together, with first ends 12a thereof defining a panel first face 16, and second, opposite, optically frosted for diffusing light, ends 12b thereof defining a panel second face 18;

image means 20 for providing an image beam 22 to said panel first face 16 for being channeled through said waveguides 12 and emitted from said panel second face 18 in the form of a viewable light image 24a;

a remote device 38 effective for selectively producing a response beam 40 over a discrete selection area 36 of said panel second face 18, said response beam 40 being diffused by the optical frosting of said ends 12b thereby to cause beam 40 to be channeled through at least one of said waveguides 12 toward said panel first face 16 and toward the sides of panel 10; and a light sensor 42,50 disposed across a plurality of said waveguides 12 for detecting said response beam 40 therein.

2. An assembly according to claim 1 wherein said light sensor 42 is in the form of a linear array mounted on any side of the optical panel and extended across said plurality of waveguides 12 and is effective for detecting said response beam 40 in each of said plurality of waveguides 12 for determining location of said selection area 36 receiving said response beam 40.

3. An assembly according to claim 2 wherein said light sensor 42 is configured for sensing from said waveguides 12 solely said response beam 40 while excluding said image beam 22.

4. An assembly according to claim 3 wherein said image means 20 and said remote device 38 are effective for producing respective image and response beams 22, 40 of different wavelengths, and said light sensor 42 is effective for optically discriminating said response beam 40 from said image beam 22.

5. An assembly according to claim 3 wherein said image means 20 and said remote device 38 are effective for producing respective image and response beams 22, 40 at different modulation frequencies, and said light sensor is effective for frequency-discriminating said response beam 40 from said image beam 22.

6. An assembly according to claim 3 wherein said remote device 38 is effective for producing a visible response mark at said selection area 36 in addition to producing said response beam 40 being detectable by said light sensor 42.

7. An assembly according to claim 6 wherein:

said remote device 38 is effective for producing both visible light to effect said response mark and non-visible light to effect said response beam 40; and said light sensor 42 is effective for detecting said non-visible light.

8. An assembly according to claim 3 wherein:

said remote device 38 includes a laser 44 for producing said response beam 40 in the form of laser light; and said image means 20 includes a laser 20a for producing said image beam 22 in the form of visible laser light.

9. An assembly according to claim 8 wherein:

said remote device laser 44 is effective for producing both visible and nonvisible laser light; and said light sensor 42 is effective for detecting solely said non-visible laser light from said remote device 38.

10. An assembly according to claim 3 further comprising:

two of said light sensors including a first light sensor 42 disposed at one end of said panel 10, and a second light sensor 50 disposed at a second side of said panel 10 across said plurality of waveguides 12 for also detecting said response beam 40 therein; and a comparator 52 operatively joined to both said first and second light sensors 42, 50 for determining vertical location of said selection area on said panel second face 18 by identifying corresponding waveguides 12 receiving said response beam 40, and for determining horizontal location of said selection area 36 along said waveguides 12 between said panel opposite ends by detecting difference in said response beam 40 sensed by corresponding ones of said light sensor linear arrays.

11. An assembly according to claim 10 wherein said comparator 52 is effective for determining intensity of said response beam 40 sensed by said first and second light sensors 42, 50, with said horizontal location of said response beam being proportional to relative intensity therebetween.

12. An assembly according to claim 10 wherein said comparator 52 is effective for determining arrival time of said response beam 40 sensed by said first and second light sensors 42, 50, with said horizontal location of said response beam being proportional to relative arrival time therebetween.

13. An assembly according to claim 10 wherein said first and second light sensors 42,50 are disposed on said panel first face 16.

14. An assembly according to claim 3 wherein said light sensor 42 comprises a linear diode array.

15. An assembly according to claim 14 wherein said linear diode array 42 includes at least one light sensing diode 42a for each of said predetermined number of waveguides 12.

16. An assembly according to claim 3 further comprising:

a controlled device 58; and a controller 48 operatively joined to said controlled device 58, said image means 20, and said light sensor 42;

said controller 48 being effective for presenting a selection menu 24a having a plurality of said selection areas 36 on said panel second face 18 for viewing by a viewer 26, said remote device 38 being pointable for directing said response beam 40 at one of said selection areas 36, and said controller 48 being effective for controlling said controlled device 58 in response to said one selection area.

17. An assembly according to claim 3 wherein said panel first face 16 is substantially perpendicular to said panel second face 18.

18. An assembly according to claim 3 wherein said light sensor 42,50 is disposed on said panel first face 16.

* * * * *